Figure 1:
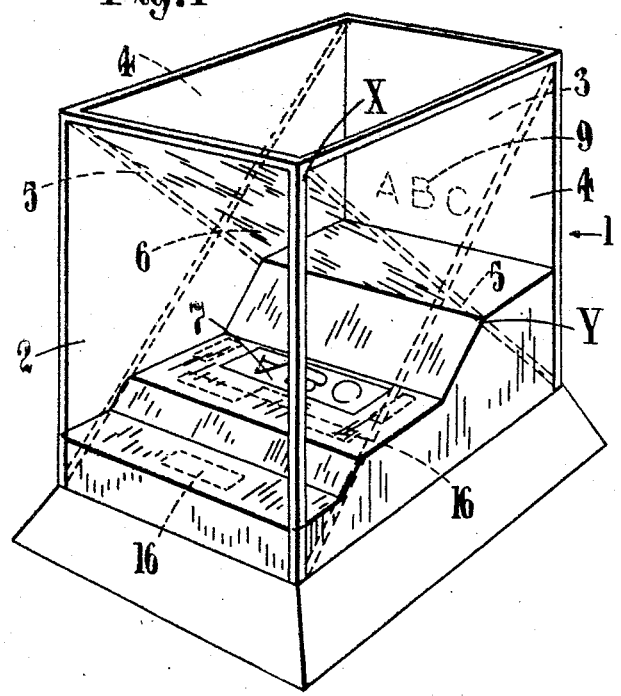

Aug. 14, 1928.

W. A. BURNS

ILLUSION DEVICE

Filed Jan. 22, 1926   2 Sheets-Sheet 1

1,680,855

INVENTOR
W. A. BURNS,
BY
ATTORNEY

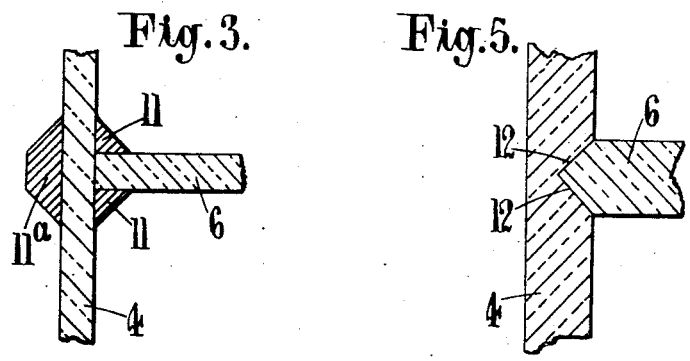
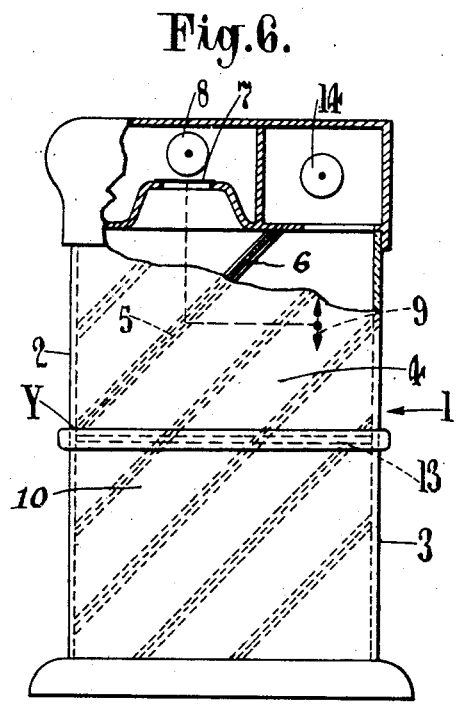

Patented Aug. 14, 1928.

1,680,855

UNITED STATES PATENT OFFICE.

WILLIAM ALBERT BURNS, OF LONDON, ENGLAND.

ILLUSION DEVICE.

Application filed January 22, 1926. Serial No. 83,148.

This invention relates to advertising and like display devices.

The principal object of the invention is to produce an improved illusion in apparatus of the phantascope type, that is to say, apparatus in which an inclined transparent mirror is employed to produce in the line of sight of the observer an image of an illuminated object, picture, lettering or the like. Other objects are to embody a phantascope in a closed box or casing which is transparent both back and front, so that the observer can see through the casing at the same time that he observes the image: to form the casing with four or more of its sides formed wholly or mainly of glass; to provide "rails" of special form whereby the presence of the mirror is not apparent from any point of view in spite of the transparent nature of the casing; and generally to provide apparatus possessing the qualities and embodying the novel combinations and arrangements of parts embodied in the examples hereinafter described and pointed out in the claims.

Referring to the drawings:—

Figure 2:
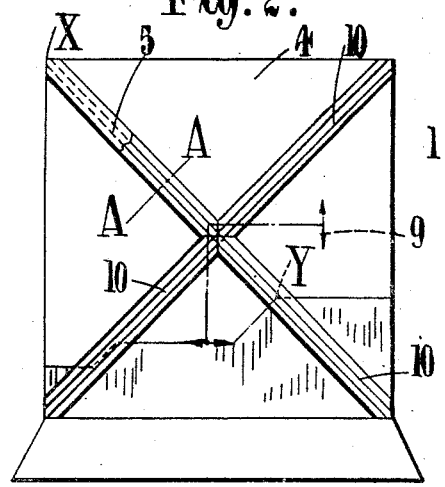
Figure 4:
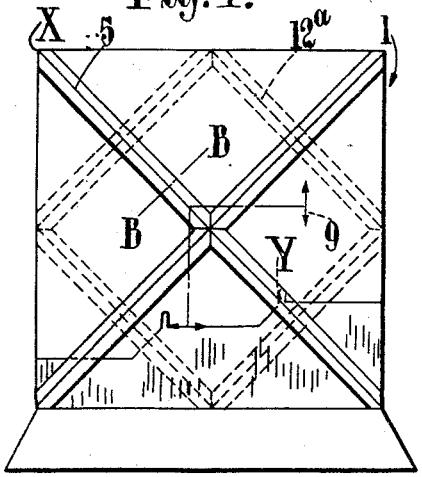

Fig. 1 is a general view of a phantascope made in accordance with the invention, Fig. 2 is a side elevation, Fig. 3 is a section on the line A—A of Fig. 2, to an enlarged scale, Fig. 4 is a side elevation showing a modified form, Fig. 5 is a section on the line B—B of Fig. 4, to an enlarged scale, and Fig. 6 is a side view partly in section of another modified form of apparatus.

Referring first generally to the figures, there is in each case an enclosed casing, designated generally as 1, including a glass front 2, a glass back 3, and glass sides 4, 4; in each case there are also "rails" 5, 5 serving to retain a transparent mirror 6. In the term "rails" I intend to include both separate mouldings, bars, guides, abutments, etc., and the sides of abutments, grooves, channels and the like actually cut or moulded in the glass forming the sides 4, 4. These rails serve as side supports for the transparent mirror 6 which extends in each case from point X to point Y and is inclined at a suitable angle. This angle is preferably 45° so as to produce a vertical image of illuminated matter which is itself actually arranged horizontally, though obviously variations of the relative angular positions of the parts can be made by those skilled in the art to produce other desired effects.

A horizontal stencil or transparency 7 is illuminated by a concealed source of light (such as the lamp 8 Fig. 6) and as a result the image 9 becomes apparent to the observer in the position indicated.

It will be observed from Fig. 1 that in addition to the rails 5 there are also dummy rails 10, 10 arranged to form a pattern, ornament, device or the like in conjunction with the operative rails. For this purpose they are made similar and may be many or few in number. When they are few, the transparent nature of the sides is intensified, but by using many it is possible to make the sides of patterned glass such as prismatic glass with the prisms running diagonally inside the casing or diagonal chequered patterns, including diagonal grooves one of which is suitably placed to receive the edge of the inclined mirror, which is preferably bevelled or otherwise shaped to conform with the section of the groove and polished to avoid stray reflections.

Referring to Figs. 2 and 3 an example is shown in which the mirror rests in rails formed of mouldings 11, 11 attached to the glass of the sides 4 and made of glass, wood or any suitable material, with the addition of external mouldings 11ª. The dummy rail portions are exactly similar and are arranged so as to form with the rails a pair of diagonal ornamental intercrossing mouldings at each side of the casing, as shown.

Referring to Figs. 4 and 5, the rails and dummy rails are all formed by the sides of V-grooves 12, and in addition to the main diagonals the possibility of using further similar grooves 12ª to complete a chequer pattern is indicated by the dotted lines.

Referring to Fig. 6 a form is shown in which the casing is inverted as compared with the other figures, the stencil 7 and lamp 8 being placed within a hollow top cover and the mirror 6 having its inclination correspondingly reversed. The grooves of which the sides form the rails 5 and the dummy rails 10, 10 are in this case all arranged parallel so that a standard form of prismatic glass might even serve for the sides. It is to be observed that in this form the stencil is concealed within a recess, whereas in Fig. 1 the stencil is intended rather to be concealed by goods, articles, packets, figures or scenic devices in suitable positions indicated by the dotted bases 16. This form also comprises another feature in that the transparent sides, back and front are continued down to form a second compartment in which there is no mirror. The rear part of the mirror compartment as well as the lower compartment may also be used for the display of goods which are illuminated by the lamp 14: this is effected by placing a horizontal glass floor between the compartments and utilizing a moulding or "rails" 13 both to support the floor and to mask the lower edge of the mirror 6. This feature of occupying only one compartment by the mirror and utilizing a division piece which has a natural and apparent function also to perform the secret function of masking the edge of the mirror is an important feature of this form of the invention.

Moreover the feature of lighting the space behind the mirror is important. The light from the lamp 14 must not impinge directly upon the back of the mirror, but so long as it is shielded to that extent the fact of the bright rear light makes the mirror practically invisible even when it is slightly smudged or imperfect.

It will be quite apparent that more than one transparency (within which term is hereinafter included any suitable illuminated article or matter) and that moving, changing, alternating or flashing devices all well known and not requiring special illustration may be combined with the novel apparatus.

In order to avoid multiple images when these are undesirable the front or back or both may be inclined so that they are no longer in parallel planes.

A convenient method is to incline the front imperceptibly backward. Any parts of which it is desired to avoid giving a reflection may be suitably treated—e. g. painted dull black.

It will be evident that the casing need not essentially be square and that the back, front and/or sides need not all or any of them essentially be formed of a single plane sheet.

I claim:—

1. An illusion device, comprising an inclosure having a glass front, a glass back, and glass sides, a transparency supported within the inclosure, rails carried by the glass sides and inclined with respect to the plane of the transparency, and a transparent mirror carried by the rails to reflect an image of the transparency in a line of vision directed through the glass front and glass back, dummy rails on the glass sides to complete with the mirror supporting rails a pattern indication to avoid directing attention to the mirror supporting rails.

2. A box sign comprising a plurality of sub-divisions each open to the sight of an observer through a glass front, an inclined transparent mirror in at least one of said sub-divisions, a division piece having a natural and apparent function and also serving the secret function of masking the edge of said mirror, and a transparency adapted to be reflected by said mirror to give an image in the line of sight of an observer through the glass front.

3. A box sign comprising a casing having a glass front, a glass back, sides of patterned glass, said patterning including inclined grooves formed in the inside thereof, a transparent mirror having its edges formed to conform with the shape of and lying within a pair of said grooves, and a transparency adapted to be reflected by said mirror to give an image in the line of sight of an observer through the glass front.

4. A box sign including in combination an inclosure having a glass front, a glass back and glass sides, an inclined transparent mirror therein, rails retaining the side edges of said mirror, dummy rails coacting with said rails in completing a conventional pattern upon said glass sides, a horizontal partition of glass dividing said casing into an upper and a lower compartment, rails supporting said partition, one of said rails concealing a horizontal edge of said mirror, and transparency disposed to be reflected by said mirror to give an image in the line of sight of an observer.

In testimony whereof I affix my signature.

WILLIAM ALBERT BURNS.